(12) United States Patent
Lanigan et al.

(10) Patent No.: US 7,136,399 B2
(45) Date of Patent: Nov. 14, 2006

(54) LATENCY HANDLING FOR INTERCONNECTED DEVICES

(75) Inventors: Peter J. Lanigan, Croydon (GB); Nicoll B. Shepherd, Coulsdon (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1030 days.

(21) Appl. No.: 09/759,184

(22) Filed: Jan. 12, 2001

(65) Prior Publication Data

US 2001/0008531 A1     Jul. 19, 2001

(30) Foreign Application Priority Data

Jan. 14, 2000   (GB)   ................. 0000874.8

(51) Int. Cl.
*H04J 3/06*    (2006.01)
(52) U.S. Cl. .................... 370/517; 375/240.28; 386/95
(58) Field of Classification Search ............... 370/516, 370/517, 518, 519, 503, 304, 509, 535, 534, 370/536, 508; 375/240.28; 348/384.1, 425.1; 386/95, 96, 97, 98
See application file for complete search history.

(56) References Cited

U.S. PATENT DOCUMENTS

| 5,396,497 | A |   | 3/1995  | Veltman ..................... 370/100 |
| 5,430,485 | A |   | 7/1995  | Lankford et al. ........... 348/423 |
| 5,594,660 | A |   | 1/1997  | Sung et al. .................. 364/514 |
| 5,668,601 | A | * | 9/1997  | Okada et al. .......... 375/240.25 |
| 5,784,572 | A | * | 7/1998  | Rostoker et al. ............ 709/247 |
| 5,913,031 | A | * | 6/1999  | Blanchard ................... 709/204 |
| 6,130,987 | A | * | 10/2000 | Tanaka ......................... 386/96 |
| 6,148,135 | A | * | 11/2000 | Suzuki ........................ 386/12 |
| 6,163,646 | A | * | 12/2000 | Tanaka et al. ................ 386/96 |
| 6,275,507 | B1 | * | 8/2001  | Anderson et al. ........... 370/487 |
| 6,349,286 | B1 | * | 2/2002  | Shaffer et al. .............. 704/503 |
| 6,356,567 | B1 | * | 3/2002  | Anderson et al. ........... 370/516 |
| 6,665,872 | B1 | * | 12/2003 | Krishnamurthy et al. ..... 725/95 |

* cited by examiner

*Primary Examiner*—Chi Pham
*Assistant Examiner*—Ronald Abelson
(74) *Attorney, Agent, or Firm*—Larry Liberchuk

(57) ABSTRACT

A data processing system comprises a cluster of devices (16) interconnected for the communication of data in streams, particularly digital audio and/or video data. One of the devices (10) is a source device for at least two data streams to be sent to one or more other devices (12, 14) as destination devices of the cluster. To enable synchronization of the stream presentations by the destination devices, some or all of the devices (10, 12, 14) carry respective tables (11, 13, 15) identifying, for that device, an identifier for each type of data stream that the device can process together with the processing delay for that stream. The or each such table is accessible via the cluster connection (18) to whichever of the devices, at source, destination or in between for the signal, is handling application of the necessary offsets.

13 Claims, 2 Drawing Sheets

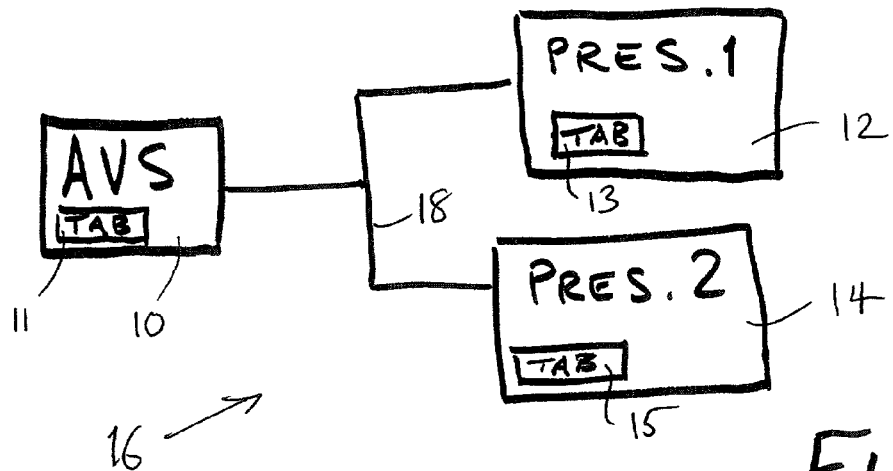
FIG. 1
| STREAM TYPE | DELAY: |
|---|---|
| MPEG1 | 0.5 seconds |
| MPEG2 | 1 second |
| DV ( < 30 Mb/s ) | 0.2 seconds |
| DV ( >= 30 Mb/s ) | 0.4 seconds |
| MPEG7 | $(0.1 * x) + (0.005 * f)$, where $x$ is the bit rate in Mb/s, and $f$ is the frame rate in frames/second. |
FIG. 2
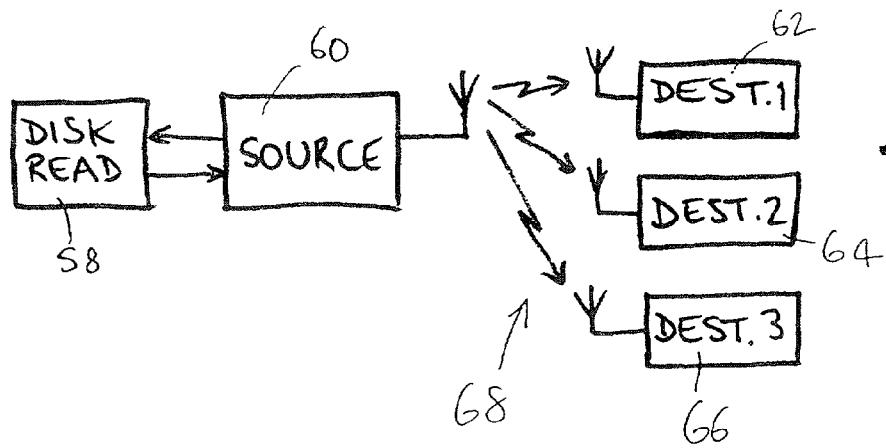
FIG. 4

LATENCY HANDLING FOR INTERCONNECTED DEVICES

The present invention relates to systems composed of a plurality of devices clustered for the exchange of audio and/or video data and control messages via wired or wireless link and, in particular although not essentially, to such systems where different data components from a source device are to be routed to respective and separate other devices of the system. The invention further relates to devices for use in such systems.

Networking or interconnection of devices has long been known and used, starting from basic systems where different system functions have been provided by separate units, for example hi-fi or so-called home cinema systems. A development has been the so-called home bus systems where a greater variety of products have been linked with a view to providing enhanced overall functionality in for example domestic audio/video apparatus coupled with a home security system and the use of telephone. An example of such a home bus system is the domestic digital bus (D2B), the communications protocols for which have been issued as standard IEC 1030 by the International Electrotechnical Commission in Geneva, Switzerland. The D2B system provides a single wire control bus to which all devices are interfaced with messages carried between the various devices of the system in a standardised form of data packet.

A particular problem that can occur with distributed systems such as hi-fi and home cinema is loss of synchronisation between different components required to be presented to a user simultaneously, in particular for video images and an accompanying soundtrack, or between different components of the soundtrack, where the different components are to be handled by different devices—for example in a home cinema set-up. This loss of synchronisation may occur due differences in the effective lengths of the transmission paths for the differing components resulting in, or due to, different latencies in decoders or intermediate processing stages for the different components.

One way to approach the synchronisation problem, where all the components are decoded within a single device, is described in U.S. Pat. No. 5,430,485 (Lankford et al) which describes a receiver for decoding associated compressed video and audio information components transmitted in mutually exclusive frames of data, each with a respective presentation time stamp. A coarse synchronisation is applied by selectively dropping frames of one or other of the components and then fine tuning by adjusting the audio stream clock frequency.

Another approach, this time closer to the source for different components being sent out, is described in U.S. Pat. No. 5,594,660 (Sung et al) which provides an audio/video decoder/decompressor for receiving and separating the components of an encoded and compressed data stream. Within the decoder/decompressor, Sung has means for breaking up a compound AV stream and then applying an appropriate temporal offset to each stream to achieve synchronisation of the outputs during playback. The differential buffering by FIFO units follows the system decoder but precedes the decoding of the audio or of the video.

Although handling the component delays with the components still encoded generally involves less processing, handling of synchronisation (particularly if done at source) can create its own problems when it comes to determining just how much delay is to be applied to each component stream.

It is accordingly an object of the present invention to provide a networked system of devices including enabling means for synchronising components intended to be presented synchronously to a user of the system.

In accordance with the present invention there is provided a data processing system comprising a cluster of devices interconnected for the communication of data in streams wherein, for at least two data streams to be sent to one or more devices as destination devices of said cluster, at least one device of the cluster comprises buffering means arranged to apply a respective delay to at least one of said at least two data streams in an amount determined by differing signal path latencies for said at least two streams; wherein at least some devices of the cluster maintain a respective table, readable via said interconnection by other devices of said cluster, each such table identifying one or more latencies for the respective device, and the means arranged to apply delays applying delays on the basis of table contents. By the use of respective tables, which are suitably (but not essentially) carried by all destination devices, the determination of what delay to apply to each data stream made be made more simply and greater flexibility is introduced to the system in that changes to processing arrangements may just require a table entry to be altered, rather than a large-scale revision of the recorded operational parameters typically held by networked devices.

Each table may identify, for its respective device, signal processing capabilities for that device, together with the latency associated with each such capability. Where one of the devices is a source device for said at least two data streams to be sent to said destination devices of said cluster, said source device may include the means arranged to apply a delay together with means arranged to read data from said respective tables of the destination devices and determine the respective delay to apply to at least one of said at least two data streams. In such an arrangement, the source device may further comprise multiplexing means coupled with the means arranged to apply a delay and arranged to combine said at least two streams into a single data stream for transmission to said destination devices.

Whilst simple figures for the respective delays may be held in each table, one or more table entries may be in the form of an algorithm requiring data from the device reading the table to enable determination of the latency of the device holding said table. For this, the determination on the basis of the algorithm may be implemented by the device reading the table, said device having downloaded the algorithm from the device holding the table: alternatively, the determination may be implemented by the device holding the table, with the results of the implementation being transmitted via said interconnection to the device reading the table.

The means arranged to apply a delay may suitably comprise buffering means (i.e. a memory device with controls over the rates of writing to, and reading from, such a device). Alternatively, the means arranged to apply a delay may comprise means arranged to selectively apply a delay to reading of one or each of said data streams from a source thereof. In this latter option, the delay means may be implemented by selective control over the reading of the data streams from (for example) disc.

The present invention also provides a data processing apparatus comprising the technical features of a source device in a system as recited hereinabove and as claimed in the claims attached hereto, to which the readers attention is now directed.

Further features and advantages of the present invention will become apparent from reading of the description of preferred embodiments of the invention, given by way of example only and with reference to the accompanying drawings, in which:

FIG. 1 represents an arrangement of three interconnected devices forming an audio/video cluster;

FIG. 2 represents a table of latency information as carried by one of the devices in the cluster of FIG. 1;

FIG. 4 represents an alternative (wireless) interconnected cluster suitable to embody the present invention.

Figure 3:
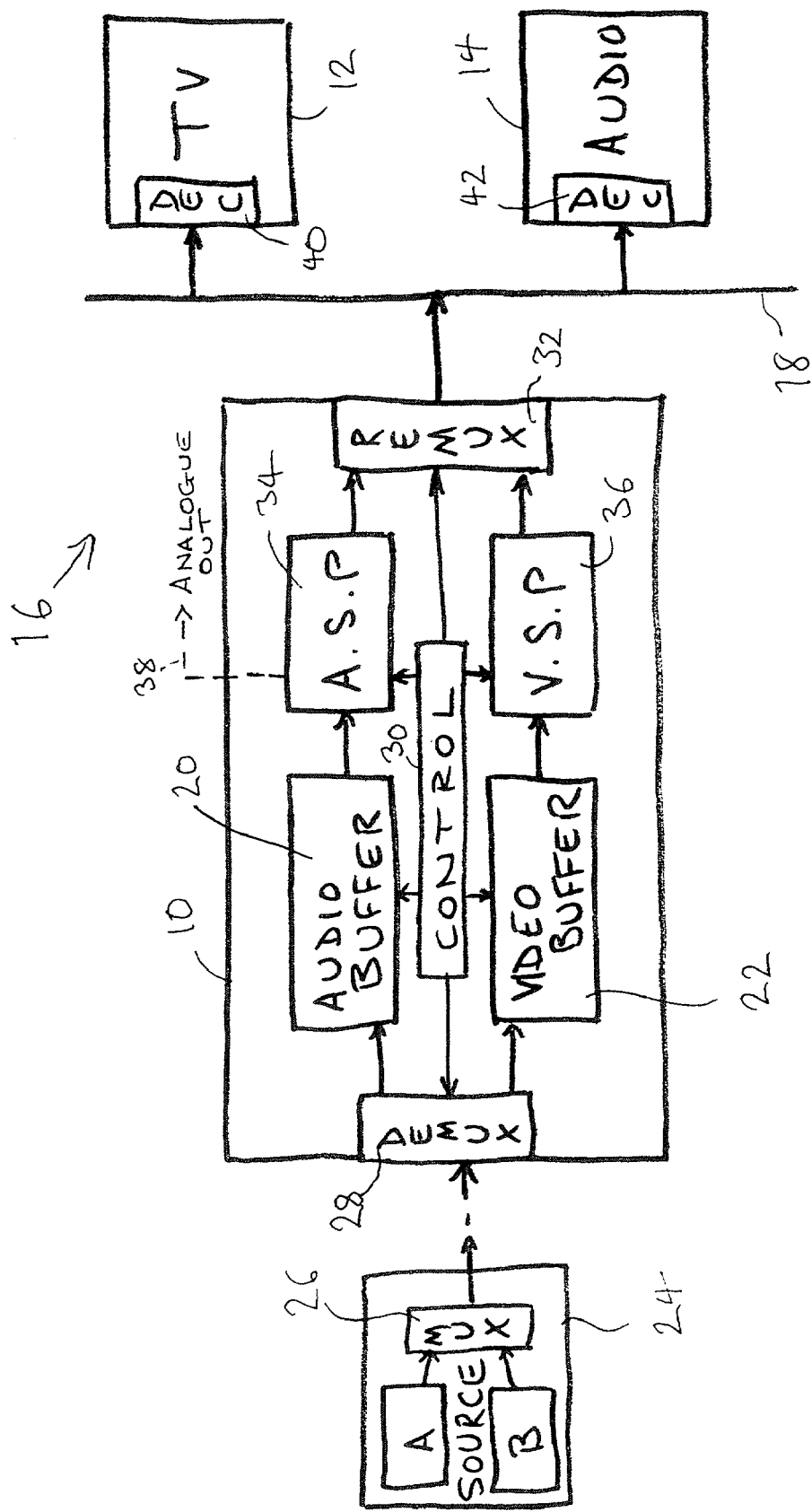
FIG. 3 represents a configuration of source device suitable to embody the present invention.

A first arrangement of interconnected devices is shown in FIG. 1, with three devices 10, 12, 14 forming a cluster 16 based around a respective bus 18 supporting communication in accordance with IEEE Standard 1394 connect and communications protocols. In the following example, reference is made to IEEE 1394, and the disclosure of the specification of this protocol is incorporated herein by reference. As will be recognised by the skilled reader, however, conformance with such protocol is not essential to the operation of the present invention.

The devices in the cluster 16 comprise a source device 10 coupled via bus 18 to a pair of presentation devices, in this example a television 12 for showing the image component of a combined AV stream from the source, and an audio processor and playback system 14 for reproducing the audio component of the AV stream.

In order to synchronise the presentation to a user of the audio and video components, a device on the network must arrange for some stream components (in this example the audio component) to be delayed relative to the others (in this case video). In the FIG. 1 example, if a data stream from the source 10 to the two destination devices 12, 14 consists of MPEG2 video and AC3 audio, where the processing delay for MPEG2 in the television 12 is 1.0 second, and the processing delay for AC3 audio in the audio presentation device 14 is 0.1 seconds, the audio signal must be delayed by (1.0−0.1)=0.9 seconds at some point along its signal path to achieve synchronisation. One technique for applying this delay is described in our co-pending commonly-assigned application entitled "Interconnection of Audio/Video Devices" and will be briefly described hereinafter with respect to FIG. 3. In order to be able to arrange for these delays, the system must have some means for determining the processing delays for the various types of data stream.

In order to enable application of the appropriate delay to counter latency in a matching stream, particularly for those devices supporting more than one processing capability (e.g. MPEG2 and DV; AC3 and MP3), each device in the cluster 10, 12, 14 is provided with a respective internal or remotely stored look-up table 11, 13, 15. In this table (an example of which is given in FIG. 2 for the television 12 from FIG. 1) there will be one entry for each type of stream that a device can process. The entry will consist of, at least, an identifier for the type of stream, and a processing delay for that stream. Other information about the stream may be contained in the table, as required.

In certain circumstances the system may support changes to the specified delays in response to user input varying one or other of the preset audio parameters. The notification for such changes will generally be in the form of a protocol-supported notification and the extent to which some or all devices of the cluster detect and record the effects of the change against their particular parameters as stored in their respective table will depend on the extent to which they follow the protocol. This also applies to their ability to read updated tables from other devices of the cluster.

A single type of stream may have different processing delays if, for example, the device has different processing delays for various ranges of bit rates for that type of stream. Also, as shown by the entry for MPEG7 stream types, an entry may consist of an algorithm to determine the delay. For example, if the delay was 0.1 seconds for every megabit per second of incoming data, the formula of (0.1*x) seconds, where x is the number of megabits per second, could be stored. With an algorithm in the table, it is either packaged such as to be available for downloading by a device seeking to determine delays, or the enquiring device may be required to submit parameter values (e.g. x) to the device holding the algorithm in its table, which device would then calculate the delay and return the value to the enquiring device. The table may be accessed by some form of read transaction (e.g. "read" operations conforming to IEEE 1394 protocols), a command protocol (e.g. AV/C), a remote method invocation protocol (e.g. request messages according to the Home Audio/Video interoperability standard—HAVi—based around IEEE1394), various Java™ RMI procedures or some other method.

As mentioned above, and described in greater detail in our co-pending application, one possible configuration for the source device 10 comprises an audio stream buffer 20 and a video stream buffer 22 for receiving separate input components from a remote signal source 24. Under the direction of a controlling processor 30, which reads the processing latencies from the tables (not shown) for destination devices 12, 14, the buffers are used to apply a respective delay to at least one of the two data streams to combat the differing processing latencies in the video 12 and audio 14 destination devices. Also under the direction of the processor 30, a multiplexer stage 32 combines the temporally offset audio and video from the respective buffers into a single data stream for transmission via the 1394 bus 18.

Whilst the signals in the respective buffers 20, 22 may simply be read out and recombined, the source device optionally further comprises data processing means interposed in the signal path between the buffers 20, 22 and the multiplexer 32. As shown, this further data processing means may take the form of an audio signal processor ASP 34 on the output to the audio signal buffer and a video signal processor VSP 36 on the output to the video signal buffer.

The first and second data streams (audio and video) may be encoded according to a first communications protocol such as MPEG1 or 2, and the destination devices 12, 14 are each provided with a respective decoder 40, 42 operating according to the said protocol.

From reading the present disclosure, other modifications and variations will be apparent to persons skilled in the art, including equivalents and features which are already known in the field of bus-connected and cordless communication systems and components and which may be used instead of or in addition to features already disclosed herein. For example, as shown by FIG. 4, the source 58 may comprise an optical or magnetic disk reader and, instead of a digital data bus, the data channel from source 60 to destination devices 62, 64, 66 may be a wireless communications link 68 for which each of the destination devices is provided with at least a receiver and the source device is provided with at least a transmitter. The system may comprise many more devices than illustrated herein including, for example, two or more source devices, and some devices of the system may have the technical features of both source and destination (for example a video cassette record and playback deck) with the appropriate source/destination behaviour being selected in dependence on the context.

In the foregoing we have described a data processing system that comprises a cluster of devices interconnected for the communication of data in streams, particularly digital audio and/or video data. One of the devices is a source device for at least two data streams to be sent to one or more other devices as destination devices of the cluster. To enable synchronisation of the stream presentations by the destination devices, some or all of the devices carry respective tables identifying, for that device, an identifier for each type of data stream that the device can process together with the processing delay for that stream. The or each such table is accessible via the cluster connection to whichever of the devices, at source, destination or in between for the signal, is handling application of the necessary offsets.

The invention claimed is:

1. A data processing system comprising a cluster of devices interconnected for communication of data in streams, wherein, for at least two data streams to be sent to one or more devices as destination devices of said cluster, at least one device of the cluster comprises means arranged to apply a respective delay to at least one of said at least two data streams in an amount determined by differing signal path latencies for said at least two streams; wherein at least some devices of the cluster maintain a respective table, readable via said interconnection by other devices of said cluster, each such respective table identifying one or more latencies for a respective device, and means arranged to apply a delay operating to apply delays on the basis of table contents, wherein one of said devices is a source device for said at least two data streams to be sent to said destination devices of said cluster, said source device including said means arranged to apply a delay together with means arranged to read data from said respective table of the destination devices and determine the respective delay to apply to at least one of said at least two data streams.

2. A system as claimed in claim 1, wherein said source device further comprises multiplexing means coupled with said means arranged to apply the respective delay and arranged to combine said at least two streams into a single data stream for transmission to said destination devices.

3. A system as claimed in claim 1, wherein said each respective table identifies, for its respective device, signal processing capabilities for that device, together with any latency associated with such capabilities.

4. A system as claimed in claim 3, wherein one or more table entries is in the form of an algorithm requiring data from a device reading the respective table to enable determination of the latency of the device holding said table.

5. A system as claimed in claim 4, wherein the determination on the basis of the algorithm is implemented by the device reading the respective table, said device having downloaded the algorithm from the device holding the table.

6. A system as claimed in claim 1, wherein said means arranged to apply the respective delay comprises buffering means.

7. A system as claimed in claim 1, wherein said means arranged to apply the respective delay comprises means ranged to selectively apply the respective delay to reading of one or each of said data streams from a source thereof.

8. A data processing system comprising a cluster of devices interconnected for communication of data in streams, wherein, for at least two data streams to be sent to one or more devices as destination devices of said cluster, at least one device of the cluster comprises means arranged to apply a respective delay to at least one of said at least two data streams in an amount determined by differing signal path latencies for said at least two streams; wherein at least some devices of the cluster maintain a respective table, readable via said interconnection by other devices of said cluster, each such respective table identifying one or more latencies for a respective device, and means arranged to apply a delay operating to apply delays on the basis of table contents, wherein the determination on the basis of the algorithm is implemented by the device holding the respective table, the results of the implementation being transmitted via said interconnection to the device reading the table.

9. A system as claimed in claim 8, wherein said each respective table identifies, for its respective device, signal processing capabilities for that device, together with any latency associated with such capabilities.

10. A system as claimed in claim 9, wherein one or more table entries is in the form of an algorithm requiring data from a device reading the respective table to enable determination of the latency of the device holding said table.

11. A system as claimed in claim 10, wherein the determination on the basis of the algorithm is implemented by the device reading the respective table, said device having downloaded the algorithm from the device holding the table.

12. A system as claimed in claim 8, wherein said means arranged to apply the respective delay comprises buffering means.

13. A system as claimed in claim 8, wherein said means arranged to apply the respective delay comprises means arranged to selectively apply the respective delay to reading of one or each of said data streams from a source thereof.

* * * * *